US012412974B2

(12) United States Patent
Miller et al.

(10) Patent No.: US 12,412,974 B2
(45) Date of Patent: Sep. 9, 2025

(54) ELECTRONIC ARTICLE SURVEILLANCE SECURITY DEVICE AND KIT

(71) Applicant: Sensormatic Electronics, LLC, Boca Raton, FL (US)

(72) Inventors: Channing E. Miller, Fort Lauderdale, FL (US); Kelvin L Hunter, Lake Worth, FL (US); Sergio M. Perez, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 48 days.

(21) Appl. No.: 18/348,094

(22) Filed: Jul. 6, 2023

(65) Prior Publication Data

US 2025/0015481 A1 Jan. 9, 2025

(51) Int. Cl.
*H01Q 1/22* (2006.01)
*H01Q 1/12* (2006.01)
*H01Q 23/00* (2006.01)

(52) U.S. Cl.
CPC ......... *H01Q 1/2208* (2013.01); *H01Q 1/1207* (2013.01); *H01Q 23/00* (2013.01)

(58) Field of Classification Search
None
See application file for complete search history.

(56) References Cited

U.S. PATENT DOCUMENTS

| | | | |
|---|---|---|---|
| D269,859 | S | 7/1983 | Paladini |
| 5,121,103 | A | 6/1992 | Minasy et al. |
| D401,595 | S | 11/1998 | Guttadauro |
| D405,090 | S | 2/1999 | Guttadauro |
| D425,903 | S | 5/2000 | Whitaker |
| 6,061,552 | A | 5/2000 | Cerasini et al. |
| D480,388 | S | 10/2003 | Spelman |
| D664,127 | S | 7/2012 | Yang |
| D683,720 | S | 6/2013 | Quinlan |
| D783,005 | S | 4/2017 | Perez |
| D813,209 | S | 3/2018 | Johnson |
| D942,004 | S | 1/2022 | Doerr |
| D956,027 | S | 6/2022 | Yang |
| D961,559 | S | 8/2022 | Perez |
| 11,461,810 | B2 | 10/2022 | Fernandez |

(Continued)

FOREIGN PATENT DOCUMENTS

EP 0668626 A1 8/1995

OTHER PUBLICATIONS

International Search Report and Written Opinion for International Application No. PCT/US2024/036574, mailed Oct. 16, 2024, 16 pages.

*Primary Examiner* — Thomas S McCormack
(74) *Attorney, Agent, or Firm* — ArentFox Schiff LLP

(57) ABSTRACT

An electronic article surveillance security device includes an antenna assembly configured to fit within a housing member, wherein the antenna assembly comprises a first antenna, a transmitter, and a receiver respectively configured to transmit a first signal to an electronic article surveillance tag device and to receive a second signal from the electronic article surveillance tag device. Additionally, the device includes a bracket member connected to the antenna assembly and configured to secure the antenna assembly, and a securing mechanism connecting the bracket member to a surface.

18 Claims, 12 Drawing Sheets

(56) References Cited

U.S. PATENT DOCUMENTS

| | | | | |
|---|---|---|---|---|
| 2010/0277322 | A1* | 11/2010 | Eckert | G08B 13/2462 340/572.1 |
| 2012/0112918 | A1* | 5/2012 | Dinh | G01V 3/10 324/228 |
| 2016/0078264 | A1 | 3/2016 | Armstrong et al. | |
| 2021/0225143 | A1 | 7/2021 | Weakley et al. | |

* cited by examiner

ELECTRONIC ARTICLE SURVEILLANCE SECURITY DEVICE AND KIT

TECHNICAL FIELD

The present disclosure generally relates to an electronic article surveillance security device, and more particularly to an electronic article surveillance security device that is easily mountable and utilizes dual AM and RFID technology.

BACKGROUND

Article security devices are typically large cumbersome devices, which require a lengthy installation process and are generally immovable once installed. A need therefore exists for an article security device, which is easily installed, and which may be readily moved or attached to a variety of surfaces.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect specifically, an electronic article surveillance security device, comprises: an antenna assembly configured to fit within a housing member, wherein the antenna assembly comprises a first antenna, a transmitter, and a receiver respectively configured to transmit a first signal to an electronic article surveillance tag device and to receive a second signal from the electronic article surveillance tag device; a bracket member connected to the antenna assembly and configured to secure the antenna assembly; and a securing mechanism connecting the bracket member to a surface.

Another example aspect includes an electronic article surveillance security device, wherein the bracket member includes a bracket base member and a plurality of L-shaped retention members extending from the bracket base member, wherein the antenna assembly is connected the plurality of L-shaped retention members on a first side of the plurality of L-shaped retention members and a second side of the plurality of L-shaped retention members face the bracket base member.

Another example aspect includes an electronic article surveillance security device, wherein each L-shaped retention member of the plurality of L-shaped retention members includes a first flange extending perpendicular to a plane of the bracket base member and a second flange connected at a distal end of the first flange and extending parallel to the plane of the bracket base member; and wherein a first L-shaped retention member of the plurality of L-shaped retention members is located at a first edge of the bracket base member and a second L-shaped retention member of the plurality of L-shaped retention members is located at a second edge of the bracket base member opposing the first edge such that, when the antenna assembly is positioned on the bracket member, the first flange of the first L-shaped retention member and the first flange of the second L-shaped retention member restrain movement of the antenna assembly in a first direction parallel to the plane of the bracket base member, and the second flange of the first L-shaped retention member and the second flange of the second L-shaped retention member restrain movement of the antenna assembly in a second direction perpendicular to the plane of the bracket base member.

Another example aspect includes an electronic article surveillance security device, wherein at least one of the plurality of L-shaped retention members is removably affixable to at least one of a plurality of wall members of the housing member.

Another example aspect includes an electronic article surveillance security device, wherein the bracket further comprises a securing portion for securing the bracket to a surface of a wall via a fastener.

Another example aspect includes an electronic article surveillance security device, wherein the securing mechanism is configured to secure the bracket member to the surface of an electronic article surveillance pedestal having a second antenna, a second transmitter, and a second receiver respectively configured to transmit and receive signals in a different frequency band relative to the first signal and the second signal respectively transmittable and receivable by the transmitter and the receiver of the antenna assembly.

Another example aspect includes an electronic article surveillance security device, further comprising a removable channel member configured to extend from a first channel member end to a second channel member end, wherein the first channel member end is adjacent to the housing member and the second channel member end is adjacent to a pedestal base member of the electronic article surveillance pedestal.

Another example aspect includes an electronic article surveillance security device, wherein the transmitter and the receiver of the antenna assembly are configured to communicate in a first frequency band with a radio-frequency identification security device, and wherein the second transmitter and the second receiver of the electronic article surveillance pedestal are configured to communicate in a second frequency band with an acousto-magnetic security device.

Another example aspect includes an electronic article surveillance security device, wherein the electronic article surveillance pedestal extends in a longitudinal plane and has a first planar side and an opposing second planar side, and further comprising: the housing member mounted on the first planar side of the electronic article surveillance pedestal and covering a first planar area of the longitudinal plane; and an overlay member mounted on the second planar side of the electronic article surveillance pedestal and covering a second planar area of the longitudinal plane, the second planar area corresponding to the first planar area of the housing member, wherein the second planar area overlaps the first planar area in the longitudinal plane of the electronic article surveillance pedestal.

Another example aspect includes an electronic article surveillance security device, wherein an area of the longitudinal plane of the electronic article surveillance pedestal corresponding to the first planar area and the second planar area is formed by a material that is translucent or transparent.

Another example aspect includes a kit for an electronic article surveillance security device, comprising: an antenna assembly configured to fit within a housing member, wherein the antenna assembly comprises a first antenna, a transmitter, and a receiver respectively configured to transmit a first signal to an electronic article surveillance tag device and to receive a second signal from the electronic article surveillance tag device; a bracket member affixable to the antenna assembly and configured to secure the antenna assembly; and a securing mechanism configured to secure the bracket member to a surface.

Another example aspect includes a kit for an electronic article surveillance security device, wherein the bracket member includes a bracket base member and a plurality of L-shaped retention members extending from the bracket base member, wherein the antenna assembly is connected the plurality of L-shaped retention members on a first side of the plurality of L-shaped retention members and a second side of the plurality of L-shaped retention members face the bracket base member.

Another example aspect includes a kit for an electronic article surveillance security device, wherein each L-shaped retention member of the plurality of L-shaped retention members includes a first flange extending perpendicular to a plane of the bracket base member and a second flange connected at a distal end of the first flange and extending parallel to the plane of the bracket base member; and wherein a first L-shaped retention member of the plurality of L-shaped retention members is located at a first edge of the bracket base member and a second L-shaped retention member of the plurality of L-shaped retention members is located at a second edge of the bracket base member opposing the first edge such that, when the antenna assembly is positioned on the bracket member, the first flange of the first L-shaped retention member and the first flange of the second L-shaped retention member restrain movement of the antenna assembly in a first direction parallel to the plane of the bracket base member, and the second flange of the first L-shaped retention member and the second flange of the second L-shaped retention member restrain movement of the antenna assembly in a second direction perpendicular to the plane of the bracket base member.

Another example aspect includes a kit for an electronic article surveillance security device, wherein at least one of the plurality of L-shaped retention members is removably affixable to at least one of a plurality of wall members of the housing member.

Another example aspect includes a kit for an electronic article surveillance security device, wherein the bracket further comprises a securing portion for securing the bracket to a surface of a wall via a fastener, and wherein the kit further comprises one or more fasteners configured to mount the bracket to the surface of the wall via the securing portion.

Another example aspect includes a kit for an electronic article surveillance security device, wherein the securing mechanism is configured to secure the housing member to the surface of an electronic article surveillance pedestal having a second antenna, a second transmitter, and a second receiver respectively configured to transmit and receive signals in a different frequency band relative to the first signal and the second signal respectively transmittable and receivable by the transmitter and the receiver of the antenna assembly.

Another example aspect includes a kit for an electronic article surveillance security device, further comprising a removable channel member configured to extend from a first channel member end to a second channel member end, wherein the first channel member end is affixable adjacent to the housing member and the second channel member end is affixable adjacent to a pedestal base member of the electronic article surveillance pedestal.

Another example aspect includes a kit for an electronic article surveillance security device, wherein the transmitter and the receiver of the antenna assembly are configured to communicate in a first frequency band with a radio-frequency identification security device, and wherein the second transmitter and the second receiver of the electronic article surveillance pedestal are configured to communicate in a second frequency band with an acousto-magnetic security device.

Another example aspect includes a kit for an electronic article surveillance security device, wherein the electronic article surveillance pedestal extends in a longitudinal plane and has a first planar side and an opposing second planar side, and further comprising: the housing member covering a first planar area of the longitudinal plane when mounted on the first planar side of the electronic article surveillance pedestal; and an overlay member having a second planar area corresponding to a first planar area of the housing member, the overlay covering a second planar area of the longitudinal plane when mounted on the second planar side of the electronic article surveillance pedestal, wherein the second planar area overlaps the first planar area in the longitudinal plane of the electronic article surveillance pedestal.

Another example aspect includes a kit for an electronic article surveillance security device, wherein an area of the longitudinal plane of the electronic article surveillance pedestal corresponding to the first planar area and the second planar area is formed by a material that is translucent or transparent.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
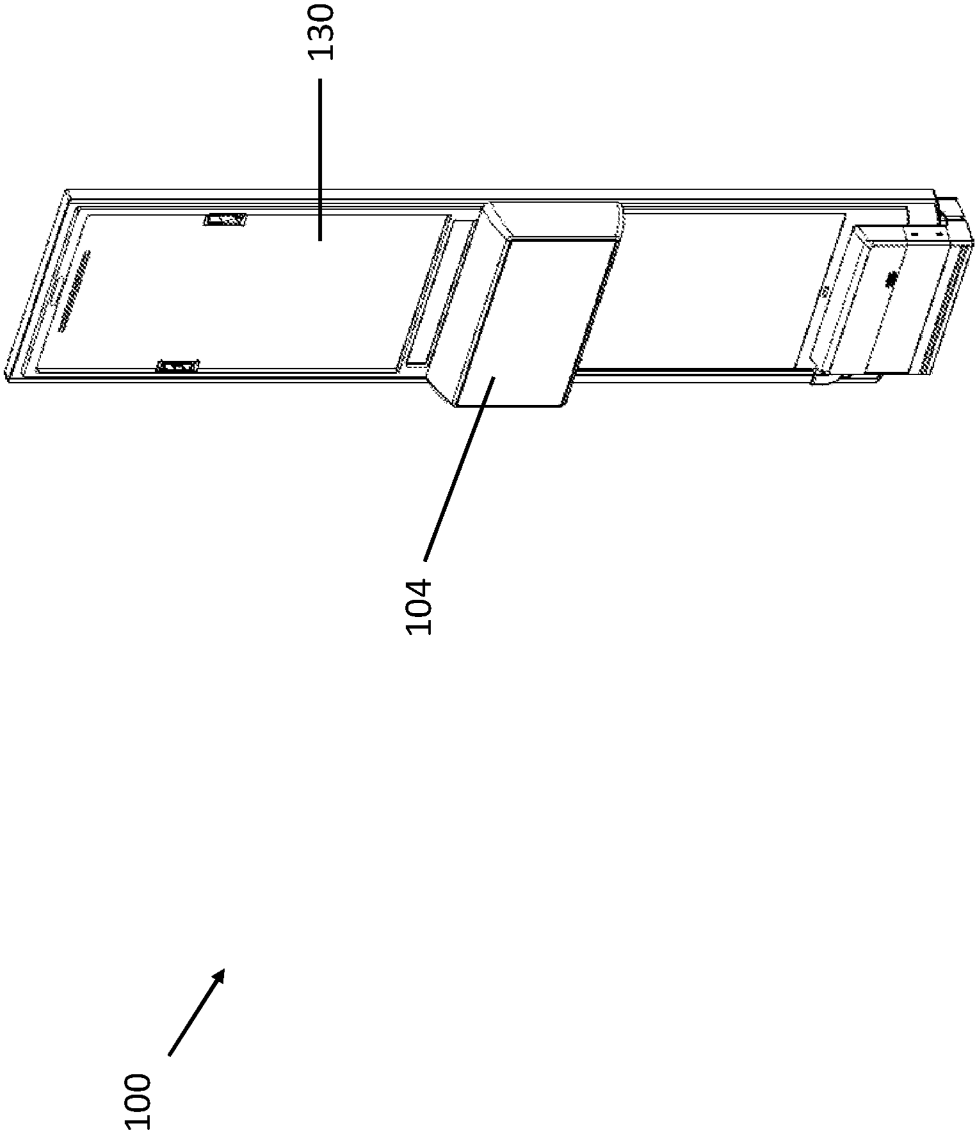
FIG. 1 is an isometric view of an example electronic article surveillance security device according to an aspect of the disclosure.
Figure 2:
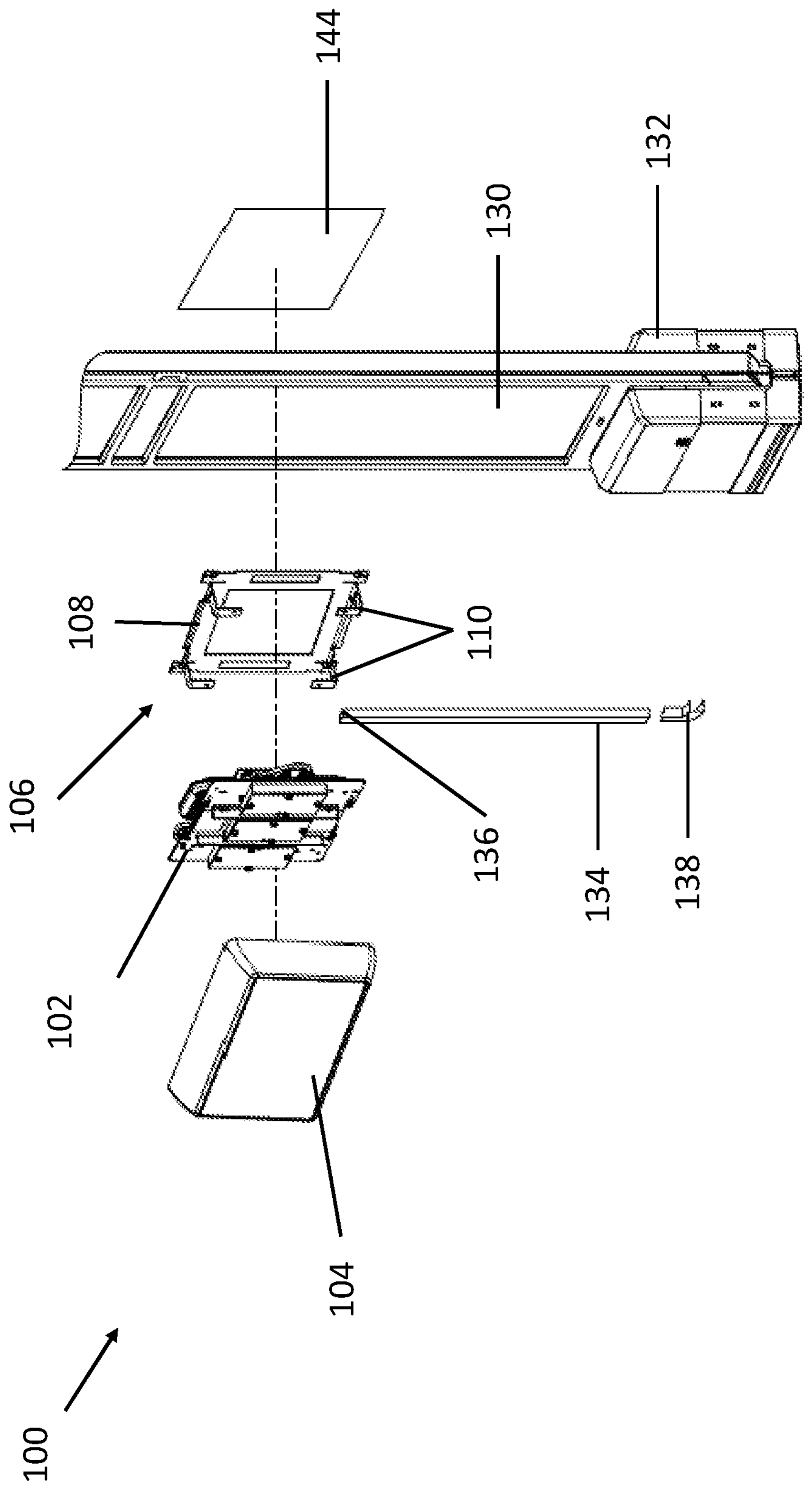
FIG. 2 is an exploded view of the example electronic article surveillance security device of FIG. 1.
Figure 4:
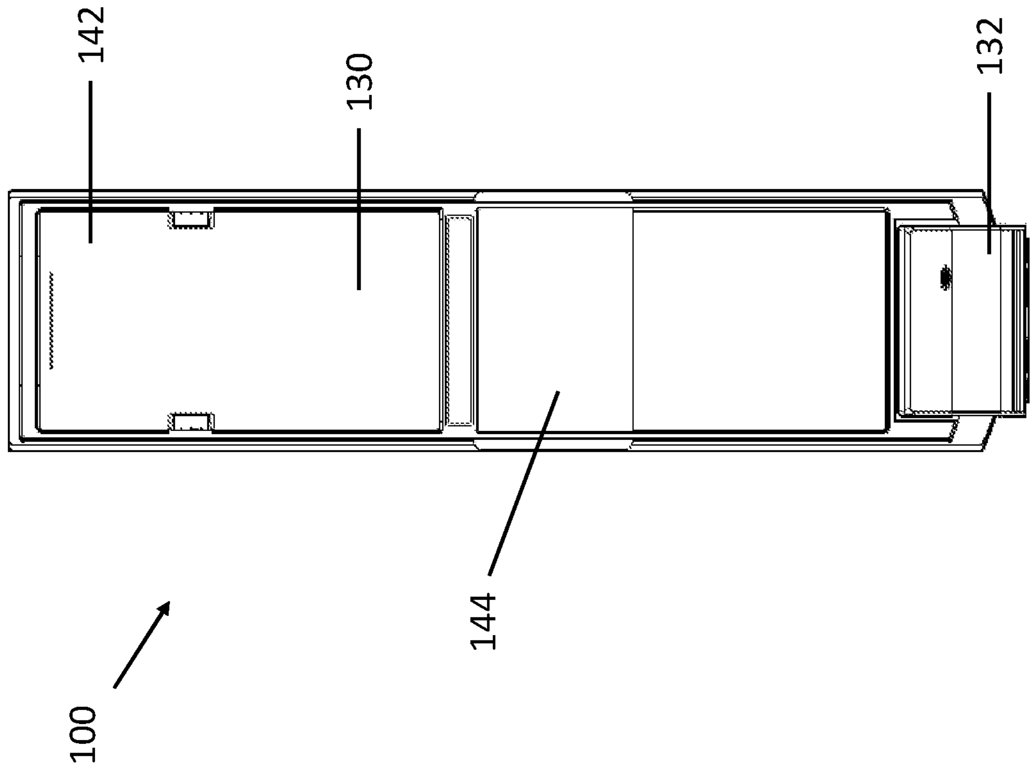
FIG. 4 is a back view of the example electronic article surveillance security device of FIG. 1.
Figure 3:
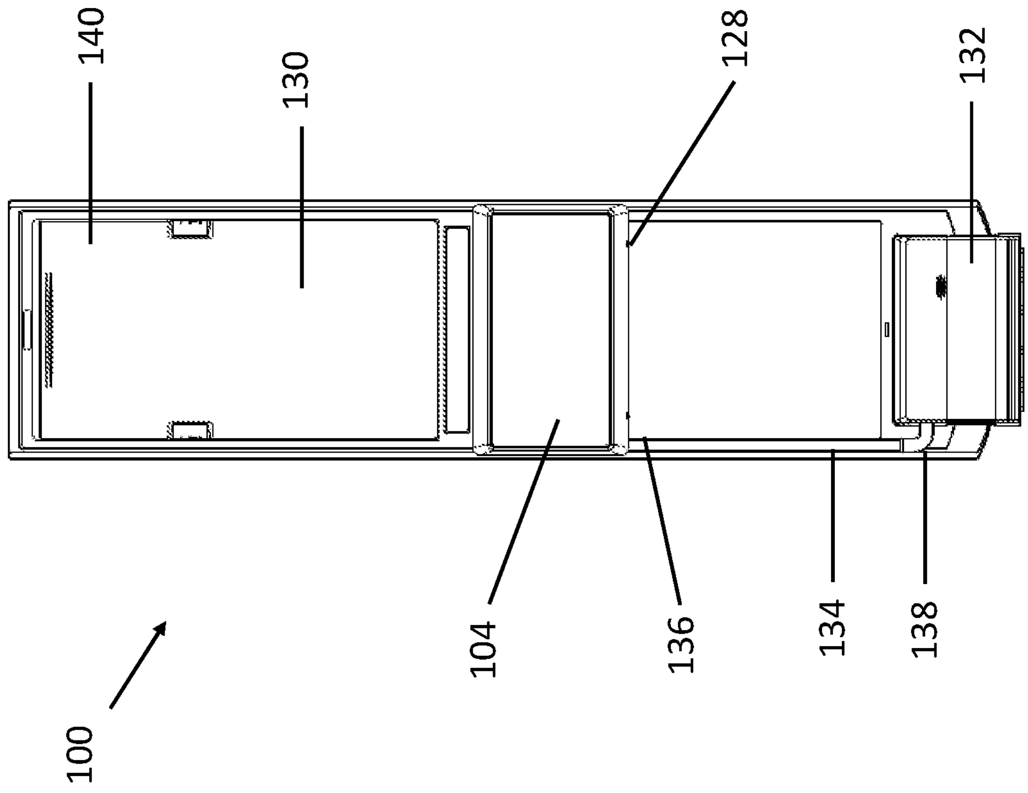
FIG. 3 is a front view of the example electronic article surveillance security device of FIG. 1.
Figure 6:
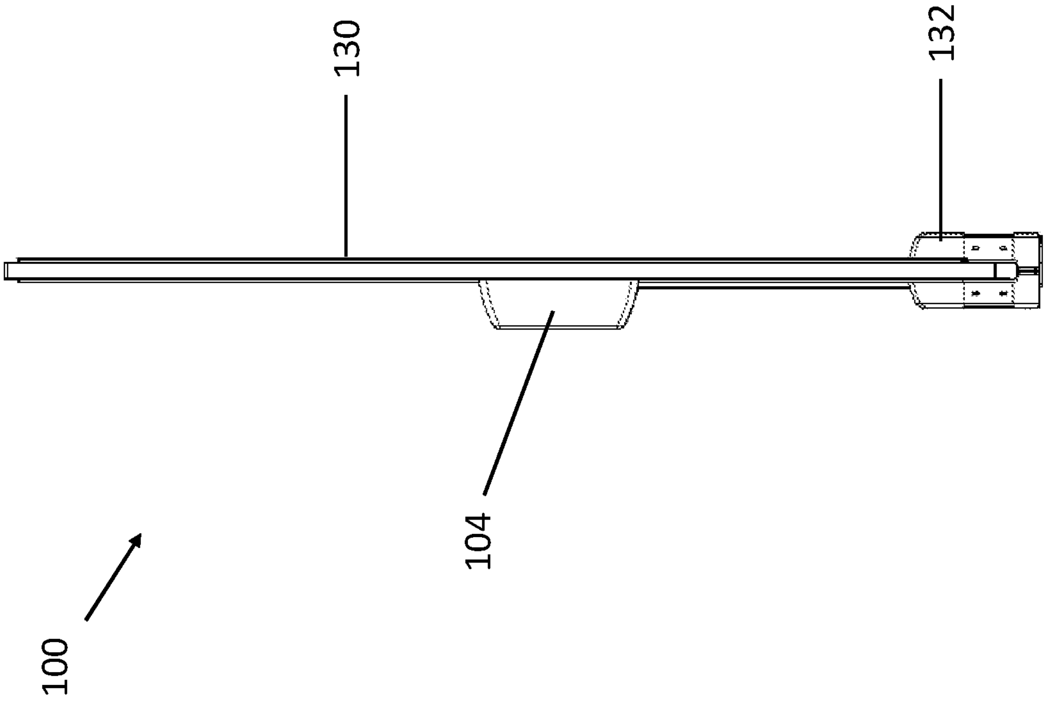
FIG. 6 is a second side view of the example electronic article surveillance security device of FIG. 1.
Figure 5:
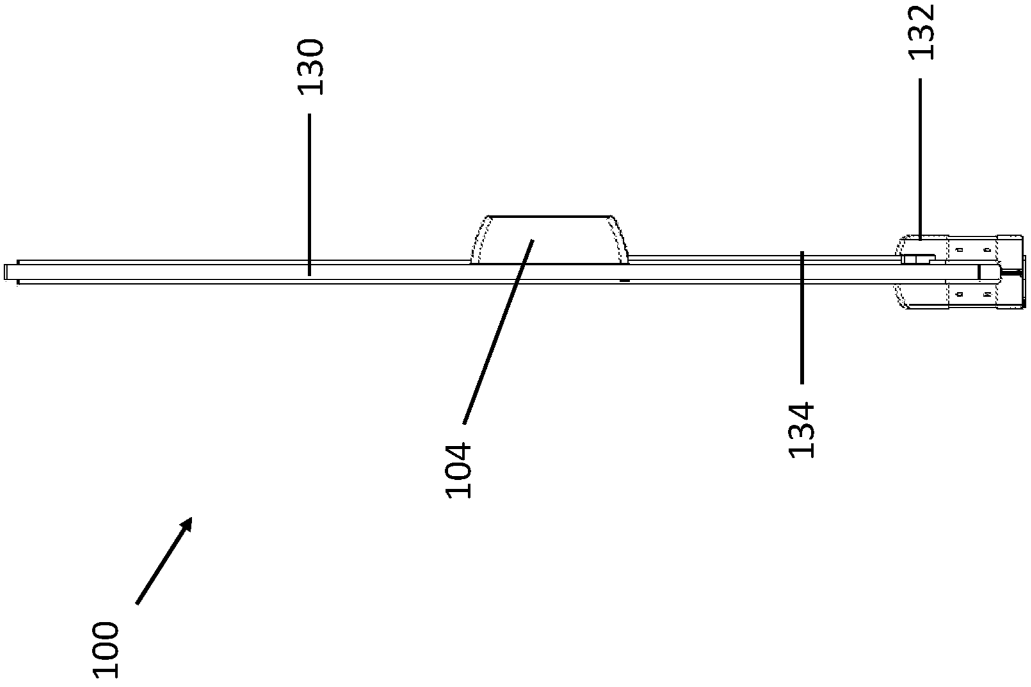
FIG. 5 is a first side view of the example electronic article surveillance security device of FIG. 1.
Figure 8:
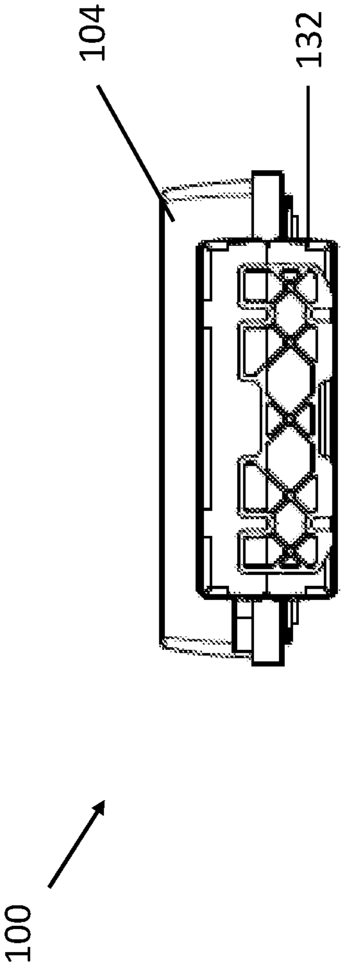
FIG. 8 is a bottom view of the example electronic article surveillance security device of FIG. 1.
Figure 7:
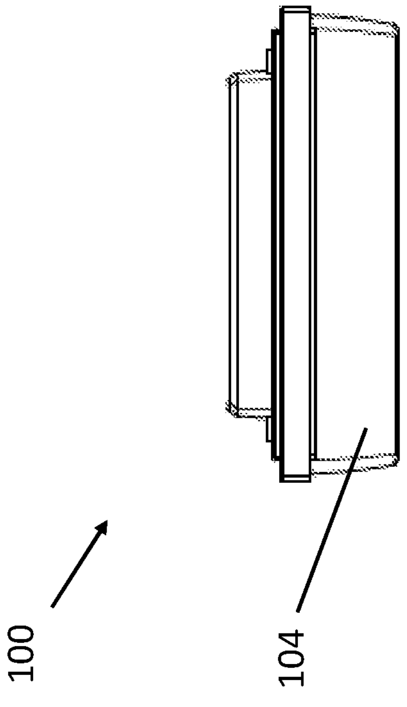
FIG. 7 is a top view of the example electronic article surveillance security device of FIG. 1.

Various aspects of the disclosure are now described with reference to the drawings, wherein like reference numerals are used to refer to elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below.

Throughout the disclosure, the terms substantially or approximately may be used as a modifier for a geometric relationship between elements or for the shape of an element or component. While the terms substantially or approximately are not limited to a specific variation and may cover any variation that is understood by one of ordinary skill in the art to be an acceptable level of variation, some examples are provided as follows. In one example, the term substantially or approximately may include a variation of less than 10% of the dimension of the object or component. In another example, the term substantially or approximately may include a variation of less than 5% of the object or component. If the term substantially or approximately is used to define the angular relationship of one element to another element, one non-limiting example of the term substantially or approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the aspects or articles described herein are in an in-use orientation. In some examples, the directional terms are expressed generally with relation to a left-hand coordinate system.

Terms such as a, an, and the, are not intended to refer to only a singular entity, but also include the general class of which a specific example may be used for illustration. The terms a, an, and the, may be used interchangeably with the term at least one. The phrases at least one of and comprises at least one of followed by a list refers to any one of the items in the list and any combination of two or more items in the list. All numerical ranges are inclusive of their endpoints and non-integer values between the endpoints unless otherwise stated.

The terms first, second, third, and fourth, among other numeric values, may be used in this disclosure. It will be understood that, unless otherwise noted, those terms are used in their relative sense only. In particular, certain components may be present in interchangeable and/or identical multiples (e.g., pairs). For these components, the designation of first, second, third, and/or fourth may be applied to the components merely as a matter of convenience in the description.

Aspects of the disclosure include an electronic article surveillance security device, e.g., an electronic article surveillance security device that is easily mountable and utilizes dual acousto-magnetic (AM) and radio-frequency identification frequency (RFID) technology.

In one example implementation, which should not be construed as limiting, the electronic article surveillance security device may include at least an antenna assembly configured to transmit a signal to an electronic article surveillance tag device and is further configured to receive a corresponding signal from the electronic article surveillance tag device. The antenna assembly is secured to a surface and within a housing member via a bracket member.

Referring to FIGS. 1-10, in one example implementation that should not be construed as limiting, an electronic article surveillance security device 100 includes an antenna assembly 102 configured to fit within a housing member 104. The antenna assembly 102 includes a transmitter and a receiver. The transmitter is configured to transmit a first signal from the electronic article surveillance security device 100 to an electronic article surveillance tag device. The receiver is configured to receive a corresponding second signal from the electronic article surveillance tag device.

The antenna assembly 102 is configured to be secured within the housing member 104 via a bracket member 106. The bracket member 106 is configured to secure the antenna assembly 102 within the housing member 104 through the use of a securing means, such as but not limited to one or more screws or a bolts. The bracket member 106 is additionally securable via a second securing means, such as not limited to one or more screws or bolts, to a surface such as a wall or a pedestal. The bracket member 106 therefore allows the antenna assembly 102 and the housing member 104 to be easily connectable to a variety of surfaces based on user need.

The bracket member 106 further includes a bracket base member 108 and one or more retention members 110, which extend from the bracket base member 108. The one or more retention members 100, may be L-shaped, for example (the terms retention member and L-shaped retention member may be used interchangeably throughout this disclosure). The antenna assembly 102 may be disconnectably connected to the plurality of L-shaped retention member 110 a first side. In an alternative aspect of the disclosure, the antenna assembly 102 may additionally be connected to the bracket base member 108 on a second side. These connections stably mount the antenna assembly 104 to the bracket member 106 so that the antenna assembly 104 can be mounted to a surface via the bracket base member 108 with the housing member 104 mounted thereon, to cover or otherwise hide the antenna assembly 102 for aesthetic purposes and to prevent damage or tampering with the antenna assembly 102. The bracket base member 108 is further connectable to a surface such as a wall or pedestal.

Figure 9:
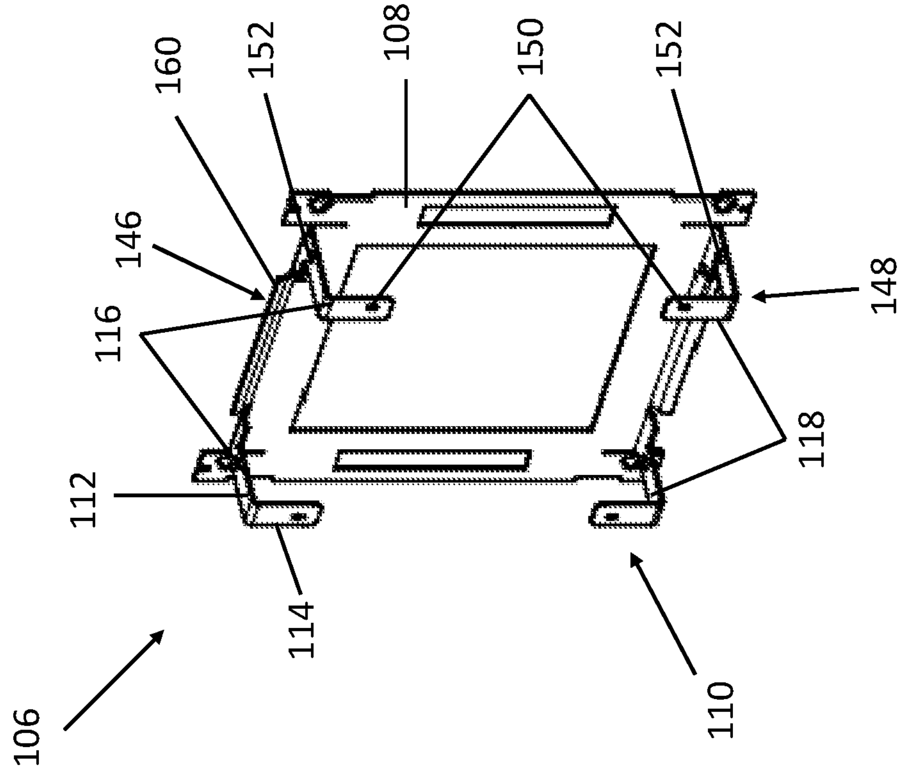
FIG. 9 is an isometric view of the bracket member of the example electronic article surveillance security device of FIG. 1.

Referring to FIG. 9, Each of the L-shaped retention members 110 may include a first flange 112 which extends perpendicular to a plane defined by the bracket base member 108. Each of the L-shaped retention members 110 may further include a second flange 114 connected at a distal end of the first flange 112. The second flange 114 extends parallel to the plane of the bracket base member 108 and normal to the first flange thereby forming an L-shape which extends from the bracket base member 108.

Further referring to FIG. 9, a first set of L-shaped retention member 116 of the plurality of L-shaped retention members 110 may be located at a first edge of the bracket base member 146 and a second set of L-shaped retention members 118 of the plurality of L-shaped retention members 110 are located at a second edge of the bracket base member 148 opposite the first edge. The first set of L-shaped retention members 116 and the second set of L-shaped retention member 118 may be configured such that when the antenna assembly 102 is positioned or mounted on the bracket member 108, the first flange 112 of each of the first set of L-shaped retention member 116 and the first flange 112 of each of the second set of L-shaped retention members 118 restrain movement of or otherwise fix the location of the antenna assembly 102 with respect to first direction that is parallel to the plane of the bracket base member 108. Further, the second flange 114 of each of the first set of L-shaped retention members 116 and the second flange 114 of each of the second set of L-shaped retention members 118 may be configured to restrain movement of or otherwise fix the location of the antenna assembly 102 with respect to a second direction that is perpendicular to the plane of the bracket base member 108, when the antenna assembly 102 is mounted thereto.

The antenna assembly 102 is further connectable to the second flange 114 of each of the plurality of L-shaped retention members 110 via securing members, such as but not limited to one or more screws or a bolts. As can be seen in FIG. 9, each second flange 114 of the plurality of L-shaped retention members 110 may include a mounting portion (e.g., as indicated by reference 150). The mounting portions 150 may be configured to receive a fastener that connects the antenna assembly 102 to the bracket member 106. In one example, each on of the mounting portions may include, but is not limited to, a through hole configured to receive a nut and/or bolt or may include a threaded opening for threadably engaging with one or more threaded fasteners. In another example, the mounting portions 150 may be openings sized to receive a self-tapping fastener. The mounting portions 150 are simultaneously configured to restrain movement of or otherwise fix the location of the antenna assembly 102 with respect to a first direction that is parallel to the plane of the bracket base member 108 and a second direction that is perpendicular to the plane of the bracket base member 108, thereby holding the antenna assembly in place.

Figure 10:
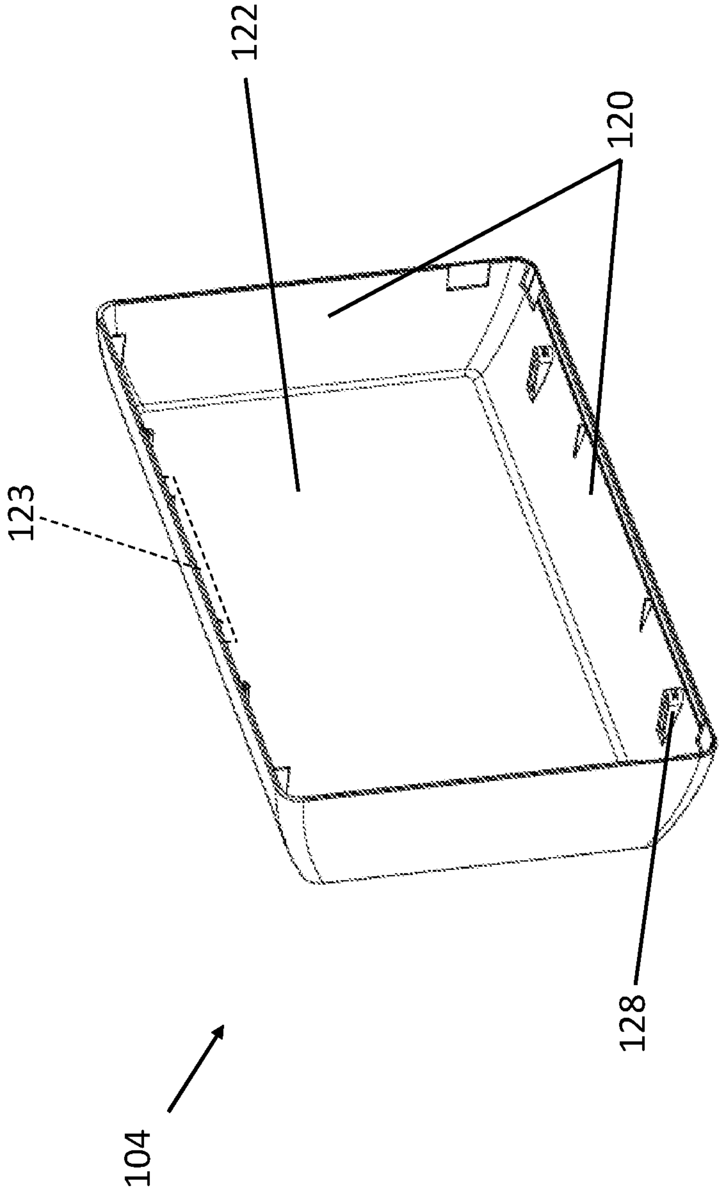
FIG. 10 is an internal view of the housing member of the example electronic article surveillance security device of FIG. 1.
Figure 11:
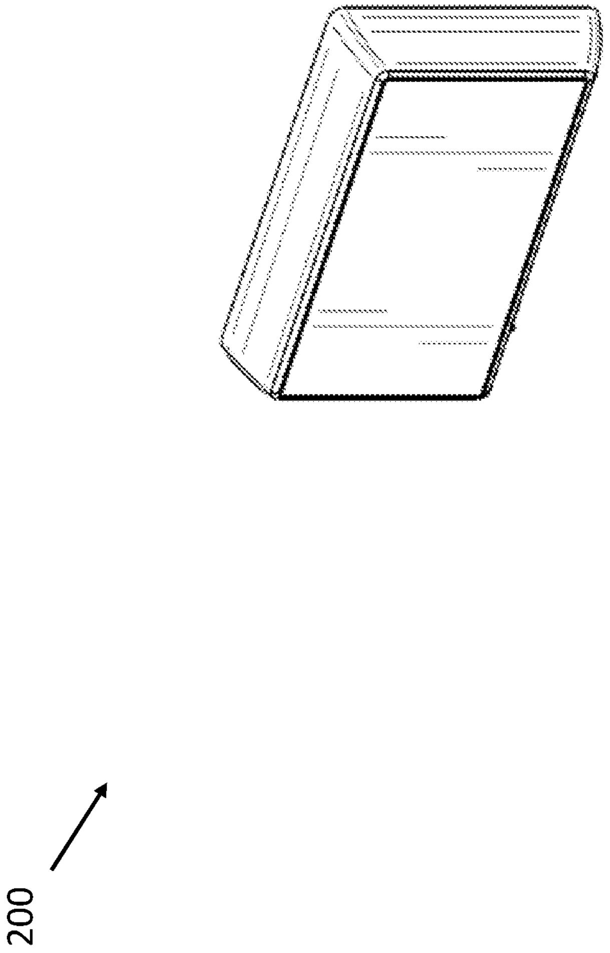
FIG. 11 is an isometric view of an example wall mountable electronic article surveillance security device.
Figure 12:
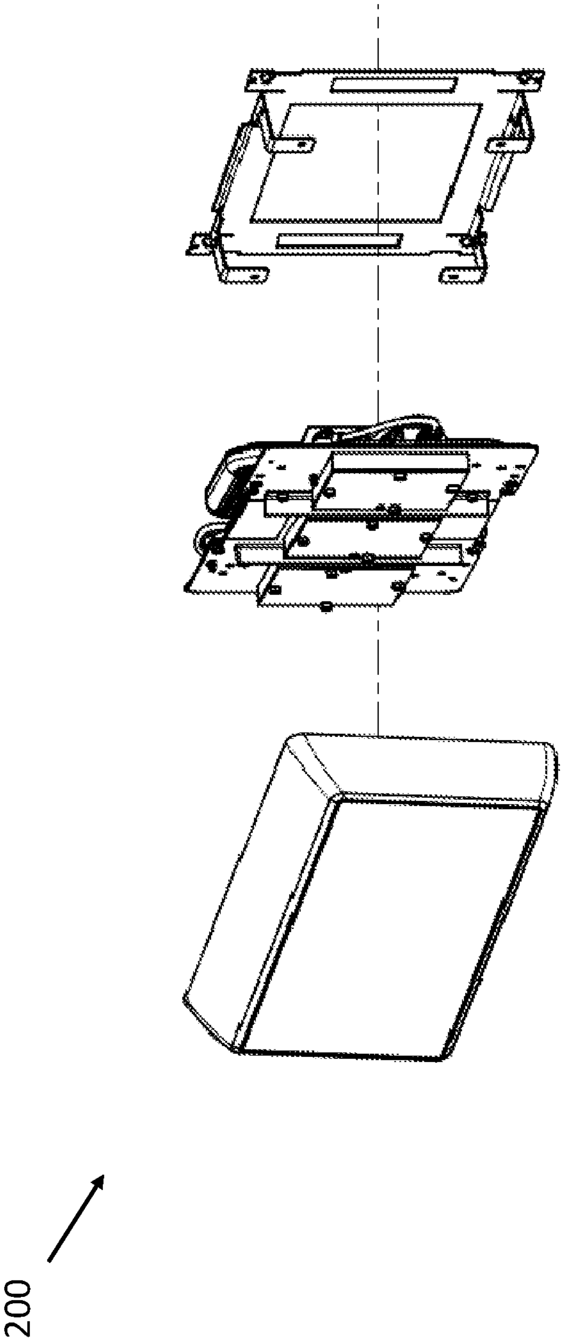
FIG. 12 is an exploded view of the example electronic article surveillance security device of FIG. 11.
Figure 13:
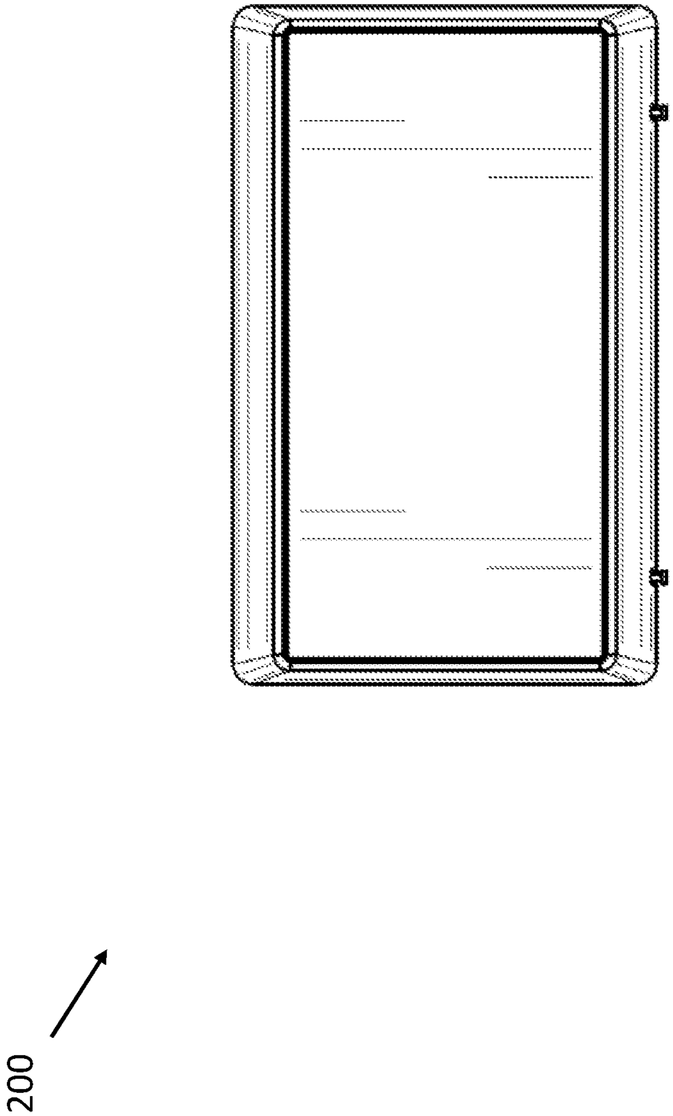
FIG. 13 is a front view of the example electronic article surveillance security device of FIG. 11.
Figure 15:
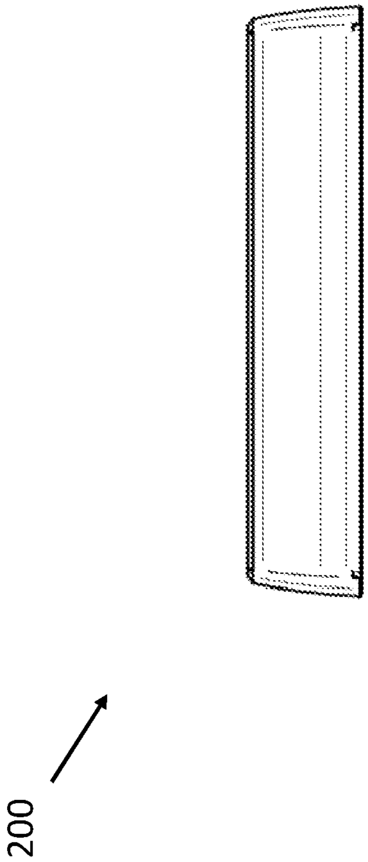
FIG. 15 is a bottom view of the example electronic article surveillance security device of FIG. 11.
Figure 14:
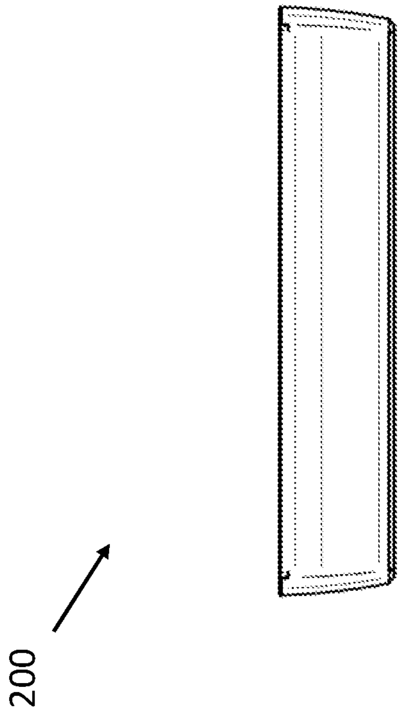
FIG. 14 is a top view of the example electronic article surveillance security device of FIG. 11.
Figure 17:
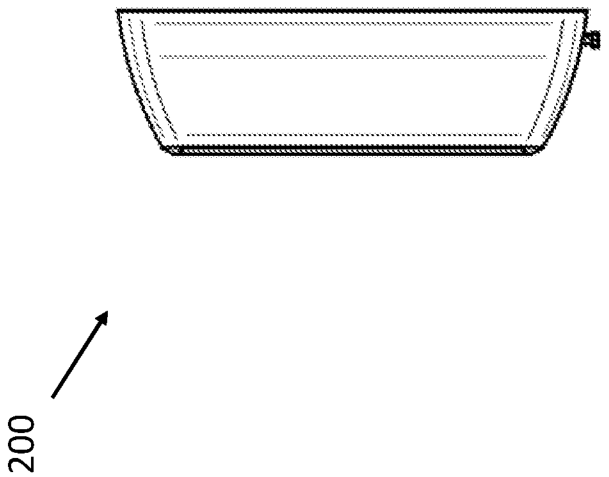
FIG. 17 is a second side view of the example electronic article surveillance security device of FIG. 11.
Figure 16:
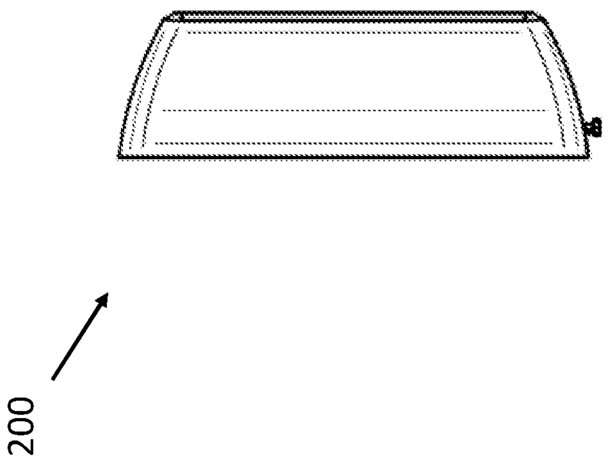
FIG. 16 is a first side view of the example electronic article surveillance security device of FIG. 11.

The housing member 104 may include at least a plurality of housing side wall members 120 and a housing top wall member 122. The bracket member 106 may further be attached to the housing member 104 on at least one of the plurality of housing side wall members 120 and/or on the housing top wall member. Referring specifically to FIG. 10, at least one of the housing side wall members of the plurality of side wall members 120 may include at least one opening 128, that may be threaded or otherwise configured the threadably receive a threaded fastener. In some aspects of the disclosure, the opening 128 may be configured to receive a self-tapping threaded fastener such as a screw. The bracket member 106 may also include a housing member mounting portion 152. It is noted that only a single housing mounting portion 152 is labeled in FIG. 9, however, any one or combination of the L-shaped members 110 is configured to include at least one mounting portion 152. The mounting portion(s) 152 may be located on the first flange 112, of at least one of the plurality of L-shaped retention members. In one example, the mounting portion 152 may be a through-hole, a threaded hole and/or may be an opening configured to receive a self-tapping fastener. The at least one opening 128 of the housing member 104 may be positioned or otherwise configured so as to align with the mounting portion of the first flange 112, of at least one of the plurality of L-shaped retention members 110, and be secured to one another via a fastener. The fastener may include but is not limited to a threaded fastener or bolt configured to be received through or threaded into mounting portion(s) 152. The housing member 104 is thereby additionally connectable to the bracket 106 through at least one of the plurality of L-shaped retention members 110.

The housing member 104 may additionally include at least one housing flange member 123 which extends from at least one of the plurality of housing side wall members 120. The at least one housing flange member 123 extends in a direction normal to the housing side wall member of the plurality of housing side wall members 120 to which it is attached. Further, the at least one housing flange member 123 extends in a direction parallel to the plane of the bracket base member 108. This allows the at least one housing flange member to be connected to the bracket base member 108 through a securing means, such as, but not limited to a screw or a bolt. The bracket base member 108 may include a bracket base retention member 160. The bracket base retention member 160 may be permanently or removably attachable to the bracket base member 108 through a securing means and may extend along at least the first edge of the bracket base member 108, or the second edge of the bracket base member 108. Further the bracket base retention member 160, may extend slightly in front of the bracket base member 108 along a plane parallel to the plane of the bracket base member 108. The at least one housing flange member 123 may then slide in between and/or underneath the bracket base retention member 160 so that at least one of the plurality of housing side wall members 120 is retained to the bracket 106 via the interaction between the bracket base retention member and the housing flange member 123.

In an additional aspect of the disclosure, as can be seen in FIGS. 1-10, the electronic article surveillance security device 100 may be connected utilizing the mechanisms described above to an electronic article surveillance pedestal 130. The electronic article surveillance pedestal 130 may further include a pedestal base member 132, which houses a second antenna, a second transmitter, and a second receiver (hidden from view). The transmitter and receiver of the second antenna are configured to transmit and receive signals of a different frequency band than the first signal and the second signal respectively transmitted and received by the transmitter and the receiver of the antenna assembly. For example the frequency of the first antenna assembly 102 including the first transmitter and the first receiver may utilized a radio-frequency identification frequency (RFID) band while the second antenna assembly, of the electronic article surveillance pedestal 130, including the second transmitter and the second receiver may utilize an acousto-magnetic (AM) frequency band, or alternatively the first antenna assembly 102 may utilize an AM frequency while the second antenna assembly may utilize an RFID frequency.

The electronic article surveillance security device 100 may additionally include a removable channel member 134. The channel member 134 is configured to extend from a first channel member end 136 to a second channel member end 138, wherein the first channel member end 136 is adjacent to the housing member 104 and the second channel member end 138 is adjacent to a pedestal base member 132 of the electronic article surveillance pedestal 130. The channel member 134 is configured to connect the first antenna assembly 102 to the second antenna assembly of the electronic article surveillance pedestal 130. Wiring may be run through the channel member 134, from the first antenna assembly 102 and the first channel member end 136 to the second antenna assembly of the pedestal base member 132 and the second channel member end 138. This connection which utilizes the channel member allows the first antenna assembly 102 including the first transmitter and the first receiver and the second antenna assembly, of the electronic article surveillance pedestal 130, including the second transmitter and the second receiver to work in unison.

Further as can be seen in FIGS. 1-8, the electronic article surveillance pedestal 130 extends in a longitudinal plane and has a first planar side 140, or front side, and an opposing second planar side 142, or back side. The antenna assembly 102, housing member 104, and bracket 106 are mounted on the first planar side 140 of the electronic article surveillance pedestal 130. The antenna assembly 102, housing member mounted 104, and bracket 106, combine to cover a first planar area of the longitudinal plane, or a first designated section on the front side of the electronic article surveillance pedestal 130. Further an overlay member 144 or panel, is mounted on the second planar side 142 of the electronic article surveillance pedestal 130 and covering a second planar area of the longitudinal plane. The second planar area corresponds to the first planar area covered by the antenna assembly 102, housing member mounted 104, and bracket 106. The second planar area overlaps the first planar area in the longitudinal plane of the electronic article surveillance pedestal 130. In other words the antenna assembly 102, housing member mounted 104, and bracket 106 are mounted on a first region on the first side of the electronic article surveillance pedestal 130 and the overlay member 142, or panel, is mounted on the back side of the electronic article surveillance pedestal 130 in a region, which corresponds to the first region. The antenna assembly 102, housing member mounted 104, and bracket 106 are thereby adjacent to the overlay member 144 and are only separated by the electronic article surveillance pedestal 130.

The antenna assembly 102, housing member 104, and bracket 106, as well as the overlay member 142 may both be mounted on their respective sides of the electronic article surveillance pedestal 130 through a securing means such as but not limited to, a through hole configured to receive a nut and bolt, or a threaded opening for threadably engaging with one or more threaded fasteners. The securing means may alternatively include an adhesive such as but not limited to a glue or double sided tape.

The electronic article surveillance pedestal 130 may be made of a translucent material. The overlay member 144, as discussed above, covers the back of the electronic article surveillance pedestal 130, and hides the antenna assembly 102, housing member mounted 104, and bracket 106 from being seen through the translucent wall of the electronic article surveillance pedestal 130.

The above-described aspects may additionally be included in a kit. The kit may include the antenna assembly 102 configured to fit within a housing member 104 via a bracket member 106 as described in the relevant portions above. The kit may also include the channel member 134 and/or the overlay member 144. In some aspects of the disclosure, the kit may include any fasteners described herein for mounting respective components of the kit. In one aspect of the disclosure, the kit may further include the electronic article surveillance pedestal 130 including a pedestal base member 132, which houses a second antenna, a second transmitter, and a second receiver as described above. Additionally, the kit may include the securing means described above to secure the relevant features to one another.

Finally, in an additional example aspect, as can be seen in FIGS. 10-16, an electronic article surveillance security device 200, may be wall mountable. The electronic article surveillance security device 200 may be mountable on any surface, and does not require a pedestal member.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

The invention claimed is:

1. An electronic article surveillance security device, comprising:

an antenna assembly configured to fit within a housing member, wherein the antenna assembly comprises a first antenna, a transmitter, and a receiver respectively configured to transmit a first signal to an electronic article surveillance tag device and to receive a second signal from the electronic article surveillance tag device;

a bracket member connected to the antenna assembly and configured to secure the antenna assembly, wherein the bracket member includes a bracket base member and a plurality of L-shaped retention members extending from the bracket base member, wherein the antenna assembly is connected to the plurality of L-shaped retention members on a first side of the plurality of L-shaped retention members and a second side of the plurality of L-shaped retention members face the bracket base member.

2. The electronic article surveillance security device of claim 1, wherein each L-shaped retention member of the plurality of L-shaped retention members includes a first flange extending perpendicular to a plane of the bracket base member and a second flange connected at a distal end of the first flange and extending parallel to the plane of the bracket base member; and wherein a first L-shaped retention member of the plurality of L-shaped retention members is located at a first edge of the bracket base member and a second L-shaped retention member of the plurality of L-shaped retention members is located at a second edge of the bracket base member opposing the first edge such that, when the antenna assembly is positioned on the bracket member, the first flange of the first L-shaped retention member and the first flange of the second L-shaped retention member restrain movement of the antenna assembly in a first direction parallel to the plane of the bracket base member, and the second flange of the first L-shaped retention member and the second flange of the second L-shaped retention member restrain movement of the antenna assembly in a second direction perpendicular to the plane of the bracket base member.

3. The electronic article surveillance security device of claim 1, wherein at least one of the plurality of L-shaped retention members is removably affixable to at least one of a plurality of wall members of the housing member.

4. The electronic article surveillance security device of claim 1, wherein the bracket member further comprises a securing portion for securing the bracket member to a surface of a wall via a fastener.

5. An electronic article surveillance security device, comprising:

an antenna assembly configured to fit within a housing member, wherein the antenna assembly comprises a first antenna, a transmitter, and a receiver respectively configured to transmit a first signal to an electronic article surveillance tag device and to receive a second signal from the electronic article surveillance tag device;

a bracket member connected to the antenna assembly and configured to secure the antenna assembly, and a securing mechanism connecting the bracket member to a surface, wherein the securing mechanism is configured to secure the bracket member to the surface of an electronic article surveillance pedestal having a second antenna, a second transmitter, and a second receiver respectively configured to transmit and receive signals in a different frequency band relative to the first signal and the second signal respectively transmittable and receivable by the transmitter and the receiver of the antenna assembly.

6. The electronic article surveillance security device of claim 5, further comprising a removable channel member configured to extend from a first channel member end to a second channel member end, wherein the first channel member end is adjacent to the housing member and the second channel member end is adjacent to a pedestal base member of the electronic article surveillance pedestal.

7. The electronic article surveillance security device of claim 5, wherein the transmitter and the receiver of the antenna assembly are configured to communicate in a first frequency band with a radio-frequency identification security device, and wherein the second transmitter and the second receiver of the electronic article surveillance pedestal are configured to communicate in a second frequency band with an acousto-magnetic security device.

8. The electronic article surveillance security device of claim 5, wherein the electronic article surveillance pedestal extends in a longitudinal plane and has a first planar side and an opposing second planar side, and further comprising:

the housing member mounted on the first planar side of the electronic article surveillance pedestal and covering a first planar area of the longitudinal plane; and an overlay member mounted on the second planar side of the electronic article surveillance pedestal and covering a second planar area of the longitudinal plane, the second planar area corresponding to the first planar area of the housing member, wherein the second planar area overlaps the first planar area in the longitudinal plane of the electronic article surveillance pedestal.

9. The electronic article surveillance security device of claim 8, wherein an area of the longitudinal plane of the electronic article surveillance pedestal corresponding to the first planar area and the second planar area is formed by a material that is translucent or transparent.

10. A kit for an electronic article surveillance security device, comprising:

an antenna assembly configured to fit within a housing member, wherein the antenna assembly comprises a first antenna, a transmitter, and a receiver respectively configured to transmit a first signal to an electronic article surveillance tag device and to receive a second signal from the electronic article surveillance tag device;

a bracket member affixable to the antenna assembly and configured to secure the antenna assembly, wherein the bracket member includes a bracket base member and a plurality of L-shaped retention members extending from the bracket base member, wherein the antenna assembly is connected the plurality of L-shaped retention members on a first side of the plurality of L-shaped retention members and a second side of the plurality of L-shaped retention members face the bracket base member.

11. The kit for the electronic article surveillance security device of claim 10, wherein each L-shaped retention member of the plurality of L-shaped retention members includes a first flange extending perpendicular to a plane of the bracket base member and a second flange connected at a distal end of the first flange and extending parallel to the plane of the bracket base member;

wherein a first L-shaped retention member of the plurality of L-shaped retention members is located at a first edge of the bracket base member and a second L-shaped retention member of the plurality of L-shaped retention members is located at a second edge of the bracket base member opposing the first edge such that, when the antenna assembly is positioned on the bracket member, the first flange of the first L-shaped retention member and the first flange of the second L-shaped retention member restrain movement of the antenna assembly in a first direction parallel to the plane of the bracket base member, and the second flange of the first L-shaped retention member and the second flange of the second L-shaped retention member restrain movement of the antenna assembly in a second direction perpendicular to the plane of the bracket base member.

12. The kit for the electronic article surveillance security device of claim 10, wherein at least one of the plurality of L-shaped retention members is removably affixable to at least one of a plurality of wall members of the housing member.

13. The kit for the electronic article surveillance security device of claim 10, wherein the bracket member further comprises a securing portion for securing the bracket member to a surface of a wall via a fastener, and wherein the kit further comprises one or more fasteners configured to mount the bracket member to the surface of the wall via the securing portion.

14. The kit for the electronic article surveillance security device of claim 10 further comprising a securing mechanism, wherein the securing mechanism is configured to secure the housing member to a surface of an electronic article surveillance pedestal having a second antenna, a second transmitter, and a second receiver respectively configured to transmit and receive signals in a different frequency band relative to the first signal and the second signal respectively transmittable and receivable by the transmitter and the receiver of the antenna assembly.

15. The kit for the electronic article surveillance security device of claim 14, further comprising a removable channel member configured to extend from a first channel member end to a second channel member end, wherein the first channel member end is affixable adjacent to the housing member and the second channel member end is affixable adjacent to a pedestal base member of the electronic article surveillance pedestal.

16. The kit for the electronic article surveillance security device of claim 14, wherein the transmitter and the receiver of the antenna assembly are configured to communicate in a first frequency band with a radio-frequency identification security device, and wherein the second transmitter and the second receiver of the electronic article surveillance pedestal are configured to communicate in a second frequency band with an acousto-magnetic security device.

17. The kit for the electronic article surveillance security device of claim 14, wherein the electronic article surveillance pedestal extends in a longitudinal plane and has a first planar side and an opposing second planar side, and further comprising:

the housing member covering a first planar area of the longitudinal plane when mounted on the first planar side of the electronic article surveillance pedestal; and an overlay member having a second planar area corresponding to the first planar area of the housing member, the overlay member covering a second planar area of the longitudinal plane when mounted on a second planar side of the electronic article surveillance pedestal, wherein the second planar area overlaps the first planar area in the longitudinal plane of the electronic article surveillance pedestal.

18. The kit for the electronic article surveillance security device of claim 17, wherein an area of the longitudinal plane of the electronic article surveillance pedestal corresponding to the first planar area and the second planar area is formed by a material that is translucent or transparent.

* * * * *